May 7, 1963 K. I. GRAHAM 3,088,262
COTTON HARVESTER
Filed April 12, 1961 2 Sheets-Sheet 1

*INVENTOR.*
KARL I. GRAHAM
BY William A. Murray
ATTORNEY

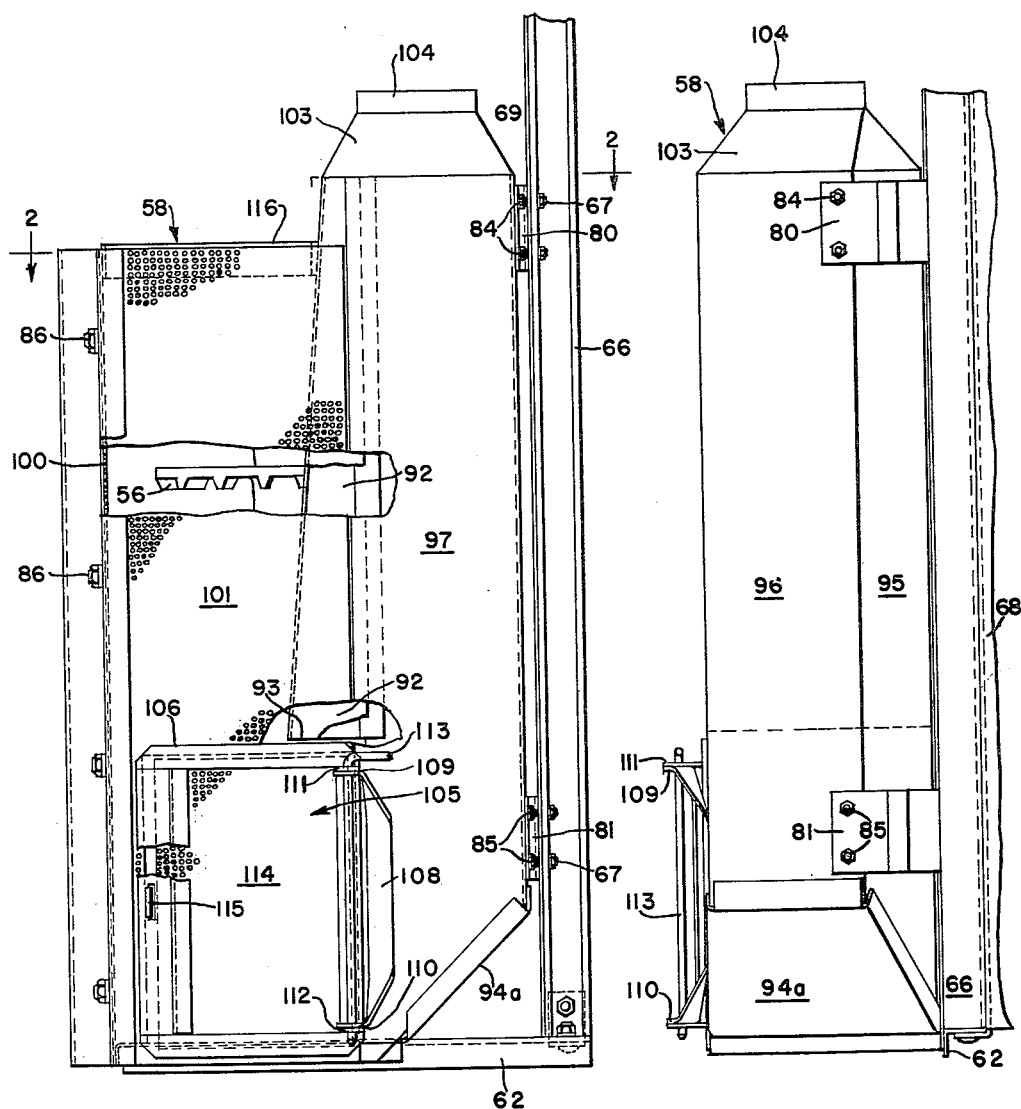

United States Patent Office 3,088,262
Patented May 7, 1963

3,088,262
COTTON HARVESTER
Karl I. Graham, Des Moines, Iowa, assignor to Deere & Company, Moline, Ill., a corporation of Delaware
Filed Apr. 12, 1961, Ser. No. 102,541
7 Claims. (Cl. 56—41)

This invention relates to a cotton harvester and more particularly to a two-row cotton harvester and still more particularly to means for permitting discharge of trash from the inner harvesting units on a two-row cotton harvester.

In U.S. Patent 2,904,948 that issued to Mr. A. L. Hubbard, September 22, 1959, there is therein shown and described a single row cotton picker. The structure shown and provided in that patent includes a pair of upright picking drums on opposite sides of the row of plants with laterally extending spindles which extend into the plants and draw the cotton bolls and a degree of trash into upright picker casings surrounding the drums. The casings are provided with rear upright openings to permit the trash collected with the cotton to be centrifically discharged rearwardly and out of the proximity of the cotton-collecting means. Doffing drums are provided adjacent to the upright picking drums and remove the cotton from the spindles and discharge the cotton outwardly into cotton door structures on the sides of the casing which feed the cotton to a suction conveying means.

In a two-row cotton harvester, there is normally provided on the picker casings inboard of the respective rows door structures which are rearward of the casings. Due to space limitations these doors cannot be placed on the side of the casing as are provided in the aforementioned Hubbard patent.

It is therefore the primary object of the present invention to provide a new and novel type of door structure for the inboard casings so shaped to provide a trash discharge opening in the rear wall of the casing in order to permit trash to be discharged rearwardly. An upright spindle casing of the present invention is so formulated to be opened entirely across its rear and to have an upright baffle extending into the casing to direct trash rearwardly. The door or panel structure extends across the rear upright opening of the casing and is formed of two compartments, one opening forwardly and positioned adjacent to doffing means within the casing. This latter compartment is generally perforated to permit air from the atmosphere to enter into the doffing structure. The door or panel structure also has an imperforate compartment adjacent to the row of plants which receives cotton from the first compartment. The two compartments are separated by an imperforate panel which generally is a continuation of the upright baffle plate. In the second compartment there is provided a forward upright panel disposed at an angle relative to the row and to the opening in the casing so that trash may pass through the opening and impinge against the panel to be guided into the cotton row and from thence to be returned to the ground.

Other objects and advantages of the invention will become apparent to those skilled in the art as the nature of the invention is better understood from the following description and as shown in the accompanying drawings.

FIG. 3 is a rear view of the door structure shown in FIG. 2 with portions broken away to show internal structure.

FIG. 4 is a right end view of the housing structure and rear portion of the picker housing shown in FIGS. 2 and 3.

Figure 1:
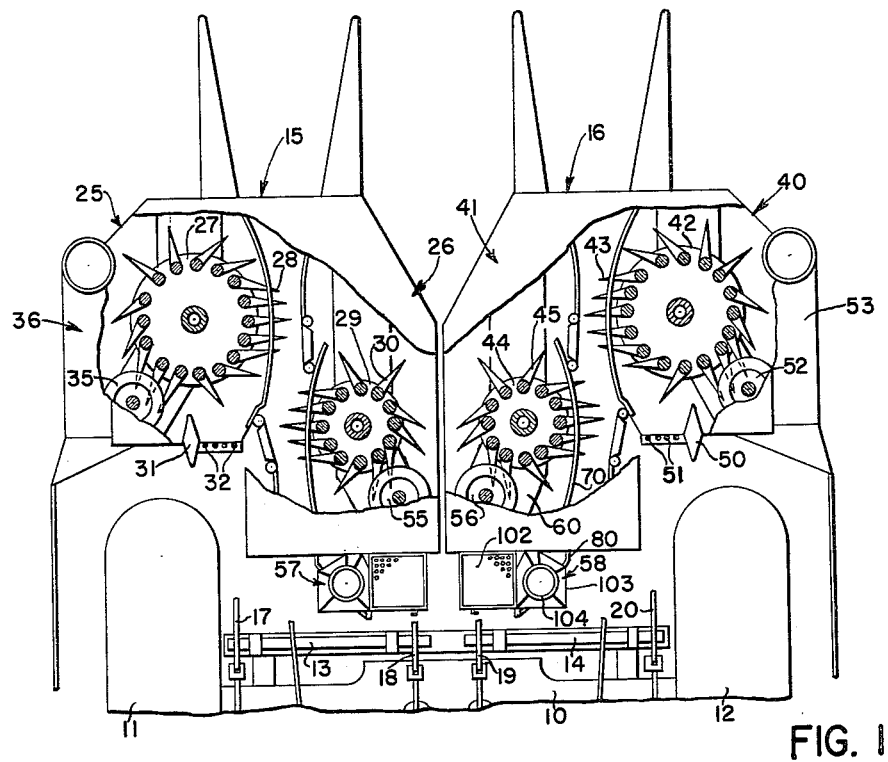
FIG. 1 is a plan view of a two-row cotton harvester which incorporates the features of the present invention. For purposes of clarity, portions of the upper housing and supporting structure are removed to indicate the location of various elements of the harvester.

The harvester is mounted on a main mobile frame shown only partially by a front transverse axle 10 and a pair of forward main traction wheels 11, 12. A pair of rockshafts 13, 14 are supported on the front axle structure 10 just forwardly thereof. A pair of forwardly projecting harvesting units 15, 16 are suspended on the rockshafts 13, 14 by means of forwardly directed rockarms 17, 18 and 19, 20 which extend forwardly therefrom. The means of mounting the harvesting units 15, 16 on the main frame 10 is generally shown and described in detail in U.S. Patent 2,469,677 issued to Mr. L. A. Paradise, August 25, 1953. Since there is no intention of making the mounting means as well as the drive means a part of the present invention, such will be shown and described only generally and not in detail. Should further detailed description be desired, however, such may be had by reference to the aforementioned Paradise patent.

The harvesting unit 15 which picks the left row of cotton plants is composed of an outboard picking casing indicated in its entirety by the reference numeral 25 and an inboard picker casing indicated in its entirety by reference numeral 26. The picker casings 25, 26 are spaced apart to provide a plant passage through which the cotton plants may pass. The casing 25 has mounted therein an upright picking drum 27 having a series of vertically spaced laterally disposed spindles 28 which extend into the plant passage and harvest ripe cotton bolls from the bolls. Similarly the picker casing 26 has an upright spindle drum 29 with laterally disposed and vertically spaced apart spindles 30 which also extend into the plant passage for harvesting ripe cotton bolls from the inboard side of the cotton plant. The spindles 28 when inserted into the cotton plant will normally wrap the ripe cotton bolls about the spindles as well as incidental trash associated with the plant into the cotton bolls. Consequently as the drum 27 rotates, there will be passed into the casing 25 considerable trash from the plant. For purposes of removing the trash, there is provided in the rear wall of the casing 25 an upright baffle structure 31 extending inwardly to an edge adjacent the ends of the spindles 28 so that the trash drawn into the casing 25 impinges against the face of the baffle 31 and is directed rearwardly through a series of upright bars 32 where the trash will pass on to the ground. The bars 32 will retain the cotton bolls which accidentally pass off of the end of the spindles 28. An upright doffing structure 35 is positioned outboard of the baffle plate 31 and normally operates to remove the cotton bolls from the spindles 28 and to cause the cotton to pass into a door structure, indicated in its entirety by the reference numeral 36 from where it will pass into a suction-type conveying system, not shown. The baffle 31, the bars 32, as well as the door structure 36 are generally shown in detail in the aforementioned Hubbard patent. The harvesting unit 16 is provided with an outboard picker casing 40 and an inboard picker casing 41 disposed on opposite sides of a plant row so as to provide a passage through which the row of plants may pass. The casing 40 has supported therein an upright spindle drum 42 with vertically spaced apart and laterally extending spindles 43 which, upon rotation of the drum 42 extend into the plant passage for purposes of removing the ripe cotton bolls from the plants. The casing 41 has an upright spindle drum 44 with vertically spaced apart laterally extending spindles 45 which, upon rotation of the drum 44, extend into the plant passage for purposes of removing the ripe cotton bolls from the inboard side of the row of plants. The outboard casing 40 is provided with a relatively open rear end and includes an upright baffle structure 50 positioned rearwardly of the drum 42 and terminating internally of the casing at a point adjacent the outer end of the spindles 43. Consequently, trash collected with the cotton by the spindles will impinge against the baffle plate structure 50 and be driven outwardly and rearwardly through upright bars 51 to pass on to the ground. A doffer structure 52 is provided on the opposite sides of the baffle structure 50 and operates to remove the ripe cotton bolls from the spindles 43 and to pass them outwardly to a door structure 53. The door structure 53 moves the cotton plants into a suction-type conveying system, not shown. Again, the latter structure is similar in most respects to that shown and described in detail in the aforementioned Hubbard patent.

Upright doffer structures 55, 56 are supported in the respective inboard casings 26, 41 just rearwardly of spindle drums 29, 44, respectively. The doffers 55, 56 remove the ripe cotton bolls from the spindle drums 29, 44 and move them rearwardly into rear upright panel or door structures indicated in their entirety by the reference numerals 57, 58 respectively. The door structures 57, 58 are substantially identical as well as their means of mounting on the respective casings 26, 41. Since the door structures 57, 58 include the main features of the present invention, only details of the inboard door structure 58 and the associated portion of the casing 41 will be shown and described in detail.

Figure 2:
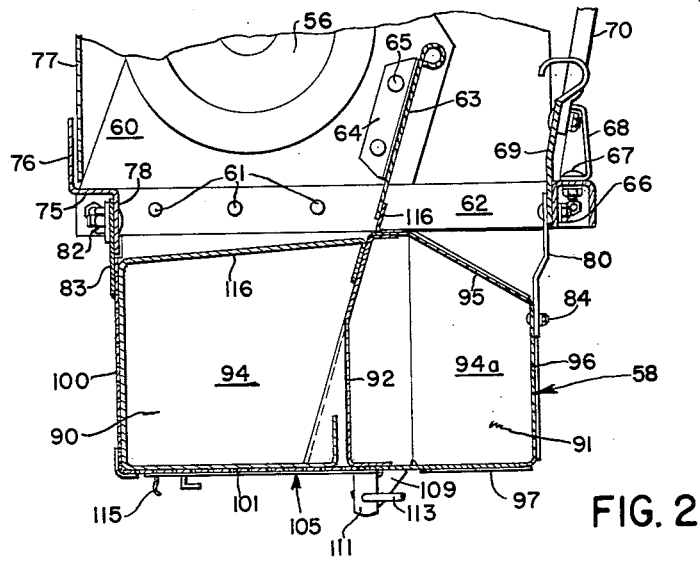
FIG. 2 is an enlarged horizontal sectional view taken through the rear door structure and rear portions of the harvesting mechanism of the inner picking structure of the right row unit and taken substantially along the line 2—2 of FIG. 3.

Referring now to FIG. 2, there is provided in the picker housing 41 an under plate or subframe 60 riveted at 61 to the underside of a transverse angle iron brace 62. The plate 60 extends forwardly from the angle iron 62 and carries the upright doffer drum 56 thereon as well as an upright baffle plate or panel 63, the latter having a lower laterally disposed flange 64 bolted to the upper surface of the subframe plate 60, the bolts being shown at 65. The baffle plate 63 extends inwardly and is disposed alongside the doffer structure 56 and generally rearwardly of the picking drum 44. Consequently trash which would normally be centrifically thrown from the spindle drum 44 will impinge against the face of the baffle plate or panel 63 adjacent the plant passage and will be driven rearwardly therefrom.

Adjacent the end of the angle iron 62 is an upright post 66 defining one edge of a rear discharge opening. Bolted at 67 to the forward face of the post 66 and to the outer face of the post 66 are forwardly directed supporting structures, indicated in their entirety by the reference numerals 68, 69, which support fore-and-aft extending grid bars 70. As is conventional, the grid bars 70 are spaced apart vertically on the order of the spindles 45 so that the spindles may pass between the grid bars and contact the cotton plants. The exact structure of the support for the grid bar 70 is not important for purposes of the present invention and is supplied only generally.

On the opposite end of the angle iron 62 is an upright supporting frame member 75 having an upright fore-and-aft extending flange 76 fixed to a side panel 77 of the casing 41. Inwardly of the upright portion 76 is a second upright portion 78 projecting rearwardly and generally opposite to the upright post 66 to thereby define the opposite edge of the material discharge opening in the rear side of the casing 41. The rear portion of the casing therefore is supplied with upright framework composed of the post 66 and support 75 on opposite sides and by the laterally disposed angle iron subframe 62. A wall or side 77 of the casing extends forwardly from the flange 76. Also bolted to the upright post 66 is a pair of vertically spaced rearwardly directed brackets 80, 81.

The portion 78 has bolted thereto, by bolt and nut combination 82, a rearwardly extending vertically disposed panel 83. The brackets 80, 81 and panel 83 support the entire door structure 58, the brackets 80, 81 being rigidly connected to the door structure 58 by means of bolts and nuts 84, 85 and the bracket 83 being welded to the door structure 58.

The door structure 58 is composed of a pair of compartments 90, 91 having a common wall 92 therebetween extending from the top of the door structure to a lower edge 93 spaced from a lower laterally disposed floor panel 94. Consequently communication is afforded between the compartment 90, 91 in the opening defined between the lower edge 93 and the upper surface of the lower panel 94. The compartment 91 is closed except for the aforesaid opening by means of a front wall 95, a side wall 96 and a rear wall 97. The front wall 95 is inclined relative to the direction of travel from a front outer edge adjacent the casing 41 to a rear edge spacedly rearward of the post 66 to thereby provide an opening between the wall 95 and the upright post 66. The brackets 80, 81 extend sufficiently rearwardly so that the forward upright wall may be so inclined. Viewing FIG. 2, it becomes apparent that the forward extremity of the wall 95 is closely adjacent to the rearward extremity of the baffle 63. Consequently, trash impinging against the baffle 63 will be carried rearwardly against the wall 95 and be directed into the plant passage where it will gravitate to the ground. It should here be recognized that trash leaving the picker at this point will merely move in an area of cotton plants which has already been harvested.

The compartment 90 is provided with perforated side and rear walls 100, 101 respectively. The front of the compartment 90 is open its entire height to receive cotton bolls being thrown or dispatched from the doffing structure 56. The entire floor panel 94 is imperforate. The top panel 102 for the compartment 90 is perforated and the top of the compartment 91 is formulated by panel structure 103 into a funnel-shaped member having an upper lip or collar 104 receiving the lower end of a suction duct, not shown. As may be seen from viewing FIGS. 3 and 4, the floor panel 94 is inclined upwardly from a point adjoining both compartments 90, 91 to a point of contact with the side panel 96. By inclining the panel portion 94a, as shown, it will tend to guide cotton bolls from the compartment 90 both upwardly into the suction area of the suction duct. Also, it will enlarge the area at the base of the door structure through which trash may be discharged. Thus, there will not tend to be an accumulation of trash and cotton causing a clogged condition at the lower extremity of the door structure.

A clean-out door 105 is provided adjacent the lower portion of the rear panel 101. A bracket structure 108, including upper and lower rearwardly extending flange portions 109, 110 is fixed to the rear surface of the panel 97. The door structure 105 includes a rectangular shaped frame, indicated in its entirety by the reference numeral 106, extending around the rectangular opening in the lower portion of the panel 101. Extending rearwardly from one edge of the rectangular frame 106 is a pair of brackets 111 and 112 which lie adjacent the aforementioned brackets 109, 110. A hinge pin 113 extends through suitable openings in the bracket structures 109—112. The main panel 114 of the door 105 is perforated and the door is provided with a spring-type latch 115 normally holding it in closed position. It will be noted that the door structure 105 is relatively low, the purpose being that an operator may approach the door structure 105 from a position beneath the axle structure 10, and the door 105 may swing open rearwardly without contacting the axle structure 10 or other portions of the picker mounting structure.

It should be noted that the partition panel 92 that separates the compartments 90, 91 is inclined at an angle to provide a wider opening at the lower portion of the door structure. Also, the panel 92 is formed to serve as a rearward continuation of the baffle panel 93. The purpose of so providing the inclined panel is to permit the lower floor portion 94a to be inclined without reducing the overall size of the opening between the lower edge 93 and the floor panel 94. Adjacent the baffle 63 and fixed to the floor surface of the front panel 95 is a small upright angle shaped panel 116 resting against the surface of the baffle 63 to thereby close the area inboard of the baffle 63 and panel 95 away from the clean cotton bolls moving into the compartment 90.

While only one form of the invention has been shown, it should be recognized that other forms and variations will occur to those skilled in the art. Therefore while the present form is shown and described in detail, it should be understood that such is shown for purposes of clearly and concisely illustrating the principles of the invention and is not intended to limit or narrow the invention beyond the broad concept set forth in the appended claims.

What is claimed is:

1. In a cotton harvester in which there is provided an upright spindle casing with a material discharge opening in one of its sides, and upright spindle and doffing mechanism adapted to dispatch trash and ripened cotton bolls through the opening, the improvement comprising: panel structure substantially of the expanse of said opening and mounted on the casing adjacent to said opening, the panel structure defining a pair of adjoining compartments with one compartment having a material receiving opening for receiving the cotton bolls from the doffing mechanism via the aforesaid discharge opening, and the other compartment being closed at its side adjacent the discharge opening by an upright panel angularly disposed from one upright edge spaced from the casing to a second edge closely adjacent the casing whereby trash exiting through the discharge opening will impinge against the latter panel and be directed outwardly.

2. The invention defined in claim 1 further characterized by said one compartment being composed at least partially of perforated panels and said other compartment is composed of imperforate panels and said compartments are separated by a common upright panel.

3. The invention defined in claim 2 further characterized by an upright baffle panel fixedly mounted within the casing and so disposed to define a continuation of the common upright panel separating the compartments, said baffle panel terminating adjacent the doffing mechanism to provide a peeling effect of the trash from the cotton and to direct the trash toward the inclined panel of said other compartment.

4. The invention defined in claim 1 further characterized by the compartments having floor paneling with the floor paneling of said other compartment being inclined upwardly from the adjoining area of the compartments.

5. The invention defined in claim 4 further characterized by a clean-out door being provided in said one compartment adjacent the floor paneling.

6. In a two-row cotton harvester in which there is provided housing structure defining a pair of fore-and-aft extending passages and including a pair of upright spindle casings disposed side by side and inboard of the respective passages, the casings having rear material discharge openings and upright spindle drums and doffing mechanism adapted to dispatch trash and ripened cotton bolls through the openings, the improvement comprising: transverse panel structures mounted on the casings adjacent to and rearwardly of each of said openings, each of the panel structures defining a pair of adjoining compartments including a first compartment adjacent the respective passage and a second compartment away from the respective passage, said second compartment opening forwardly to receive the cotton bolls from the doffing mechanism, said first compartment being closed at is forward side by an upright panel angularly disposed from a rear edge adjacent the passage and spacedly rearward of the casing to a front edge closely adjacent the casing and spaced from the passage, the latter panel thereby being disposed to block trash exiting through the discharge opening and to direct it rearwardly toward the passage.

7. In a two-row cotton harvester in which there is provided housing structure having a pair of fore-and-aft spaced apart plant passages and including a pair of upright spindle casings disposed side by side and between the passages, the casings having rear material discharge openings and upright spindle drums and doffing mechanism adapted to dispatch trash and ripened cotton bolls through the openings, the improvement comprising: panel structures mounted on the casings adjacent to and for substantially closing each of said openings, each of the panel structures defining a pair of adjoining compartments including a compartment adjacent the passage and a compartment away from the passage, the latter compartment opening forwardly to receive the cotton bolls from the doffing mechanism, the former compartment being closed at its forward side by an upright panel, spacedly rearward of the casing, the panel being disposed to block trash exiting through the discharge opening and to direct it rearwardly and toward the passage.

References Cited in the file of this patent

UNITED STATES PATENTS

| | | |
|---|---|---|
| 2,649,677 | Paradise | Aug. 25, 1953 |
| 2,904,948 | Hubbard | Sept. 22, 1959 |